(12) United States Patent
Fujiwara et al.

(10) Patent No.: US 8,745,811 B2
(45) Date of Patent: Jun. 10, 2014

(54) CONNECTION MEMBER IN WIPER BLADE

(75) Inventors: Masaru Fujiwara, Annaka (JP); Jun Abe, Ashikaga (JP); Ken Machida, Sano (JP)

(73) Assignee: Mitsuba Corporation, Kiryu-Shi (JP)

( * ) Notice: Subject to any disclaimer, the term of this patent is extended or adjusted under 35 U.S.C. 154(b) by 989 days.

(21) Appl. No.: 12/223,058

(22) PCT Filed: Jan. 26, 2007

(86) PCT No.: PCT/JP2007/051230
§ 371 (c)(1),
(2), (4) Date: Jul. 22, 2008

(87) PCT Pub. No.: WO2007/088780

PCT Pub. Date: Aug. 9, 2007

(65) Prior Publication Data
US 2009/0293218 A1   Dec. 3, 2009

(30) Foreign Application Priority Data
Jan. 31, 2006 (JP) .................. 2006-022444

(51) Int. Cl.
*B60S 1/40* (2006.01)
(52) U.S. Cl.
USPC .................. 15/250.32; 15/250.31; 15/250.43
(58) Field of Classification Search
USPC ...................................... 15/250.32
IPC ....................................... B60S 1/40
See application file for complete search history.

(56) References Cited

U.S. PATENT DOCUMENTS

| 4,598,438 A | 7/1986 | Egner-Walter et al. |
| 4,967,438 A | 11/1990 | Arai et al. |
| 6,353,962 B1 | 3/2002 | Matsumoto et al. |

FOREIGN PATENT DOCUMENTS

| DE | 28 29 437 A1 | 1/1980 | |
| GB | 2 019 203 A | 10/1979 | |
| JP | A 60-94855 | 5/1985 | |
| JP | B2 62-5817 | 2/1987 | |
| JP | Y2 1-34917 | 10/1989 | |
| JP | Y2 2569487 | 4/1998 | |
| JP | A 11-310110 | 11/1999 | |
| JP | 2001354120 A * | 12/2001 | ............... B60S 1/40 |
| JP | A 2001-354120 | 12/2001 | |
| JP | A 2004-330835 | 11/2004 | |

* cited by examiner

*Primary Examiner* — Monica Carter
*Assistant Examiner* — Stephanie Berry
(74) *Attorney, Agent, or Firm* — Oliff PLC (57) ABSTRACT

A connection member that includes right and left side walls; a shaft support portion that is swingably fitted onto a support shaft that is provided at the blade main body; upper and lower pieces that are formed so as to be continuous from the shaft support portion; and projections that come into sliding contact with inner side surfaces at the opening are formed on outer side surfaces of the right and left side walls, wherein: the shaft support portion and the upper piece are integrally formed so as to bridge the right and left side walls, the lower piece is formed so as to be separated from the right and left side walls by a groove, and outward projection amounts of the projections are larger at the lower piece than at the upper piece.

9 Claims, 6 Drawing Sheets

CONNECTION MEMBER IN WIPER BLADE

CROSS-REFERENCE TO RELATED APPLICATION

This application is the U.S. National Phase of PCT/JP2007/051230, filed Jan. 26, 2007, which claims priority from Japanese Patent Application No. 2006-022444, filed Jan. 31, 2006, the entire disclosure of which is incorporated herein by reference.

BACKGROUND

The present disclosure relates to a connection member.

There exists a connection member (U clip) that is attached to a blade main body in order to connect a wiper blade to a tip end portion of a wiper arm. The connection member is swingably attached to a support shaft at a side of the blade main body. A U-shaped tip end portion is formed on the tip end portion of the wiper arm so as to fit and connect onto a U-shaped connection that is formed between right and left side walls of the connection member. As a result, the connection member can swingably attach the wiper blade to the wiper arm (see Japanese Utility Model Registration No. 2569487 and Japanese Published Unexamined Patent Application No. H11-310110, for example).

Outer surfaces of the right and left side walls of the connection member are made to slide on side plates at a side of the blade main body in order to prevent vibration (jounce) in a wiping direction of the wiper blade. However, the connection member is structured such that its connection part, whose outer surfaces are U-shaped, is vertically open. That is, upper and lower portions at the right and left side walls are open so as to be lip-shaped. After resin molding, such resin is apt to be drawn inward due to resin shrinkage, for example. As a result, the slide with the blade main body side is insufficient, and a vibration problem thus occurs at the time of wiping, for example. In order to overcome the problem, proposed projections are formed with the same projection amounts on the outer surfaces of the right and left side walls of the connection member so that the projections can securely contact and slide on the side plates at the blade main body side (see Japanese Published Unexamined Patent Application No. 2004-330835, for example).

SUMMARY

The connection part, which is formed between the right and left side walls, comprises a shaft support portion that fits and swingably supports the support shaft that is provided to the blade main body; and upper and lower pieces that are continuous from the shaft support portion and extend toward a side of a base end in an arm length direction of the wiper arm. The connection part has the U-shaped outer surfaces. The shaft support portion and the upper piece are integrally formed so as to bridge the right and left side walls. Upper halves of the right and left side walls are thus supported by the upper piece that is integrated with the right and left side walls. As a result, a deformation rarely occurs at the upper halves, which provides a secure slide with the blade main body side.

However, the lower piece, which is removably attached to the wiper arm tip end portion, is separated from the right and left side walls so as to be elastically deformable. Lower halves of the right and left side walls are thus not supported by the lower piece, because the lower piece is not connected with the right and left side walls. As a result, an inward deformation may easily occur at the lower halves. Accordingly, by using the connection member with the proposed projections being provided, the lower halves cannot sufficiently slide with the blade main body side. Such wiper blade thus lacks a sufficient preventive function against vibration. The present disclosure solves the problem as well as other problems and is also able to achieve various advantages.

The disclosure addresses an exemplary aspect of a connection member that is swingably fitted into an opening that is formed at a blade main body of a wiper blade so as to connect the blade main body to a wiper arm, the connection member including right and left side walls; a shaft support portion that is swingably fitted onto a support shaft that is provided at the blade main body; upper and lower pieces that are formed so as to be continuous from the shaft support portion; and projections that come into sliding contact with inner side surfaces at the opening are formed on outer side surfaces of the right and left side walls. The shaft support portion and the upper piece are integrally formed so as to bridge the right and left side walls, the lower piece is formed so as to be separated from the right and left side walls by a groove, and outward projection amounts of the projections are larger at the lower piece than at the upper piece.

In another exemplary aspect, the projections are formed so as to be stepped such that the outward projection amounts are larger at the lower piece than at the upper piece.

In another exemplary aspect, the projections include upper projections that are partitioned by a lateral concave groove at an upper side; and lower projections that are partitioned by the lateral concave groove at a lower side.

In another exemplary aspect, the projections are formed so to be inclined such that the outward projection amounts are larger at the lower piece than at the upper piece.

In another exemplary aspect, the projections include upper projections and lower projections; and the lower projections, which maintain larger projection amounts than the upper projections, include smaller projection amounts at a side of the shaft support portion.

In another exemplary aspect, the projections include upper projections and lower projections; the upper projections have a plane shape that vertically extends in an arm length direction of the wiper arm with respect to the upper piece; and the lower projections have a plane shape that vertically extends in an arm length direction with respect to the lower piece.

In another exemplary aspect, the projections include upper projections and lower projections; and the lower projections are partitioned into front and rear portions by a longitudinal concave groove that is positioned at an intermediate portion in an arm length direction.

According to various exemplary aspects of the disclosure, even if a lower side of the right and left side walls greatly deforms because the lower piece is separated from the right and left side walls, the lower projections with larger projection amounts reliably come into sliding contact with the opening inner side surfaces. As a result, the wiper blade can be obtained with an excellent function to prevent vibration.

According to various exemplary aspects of the disclosure, by the steppedly different projections, the wiper blade can be obtained with an excellent function to prevent vibration.

According to various exemplary aspects of the disclosure, because the stepped different projections can easily deform inward, the wiper blade can be obtained with an excellent function to prevent vibration.

According to various exemplary aspects of the disclosure, by the inclined projections, the wiper blade can be obtained with an excellent function to prevent vibration.

According to various exemplary aspects of the disclosure, a support function of the shaft support portion can be provided at the side of the shaft support portion of lower side portions of the left and right side walls with larger deformation amounts. A portion with a smaller deformation amount has a smaller projection amount. A portion at a side of the base end with a largest deformation amount in the arm length direction has a larger projection amount. Sliding is then secured, and the wiper blade can thus be obtained with an excellent function to prevent vibration.

According to various exemplary aspects of the disclosure, siding can be secured by four projections that are respectively formed on the right and left sides. The wiper blade can thus be obtained with an excellent function to prevent vibration.

According to various exemplary aspects of the disclosure, because of the shaft support portion, the lower portions of the right and left side walls are capable of deforming corresponding to different deformation amounts between the front and the rear portions. The wiper blade can thus be obtained with an excellent function to prevent vibration.

BRIEF DESCRIPTION OF THE DRAWINGS

Various embodiments of the disclosure will be described with reference to the drawings, wherein:

FIG. 2A is a side view, FIG. 2B is a plan view.

DETAILED DESCRIPTION OF EMBODIMENTS

Figure 1A:
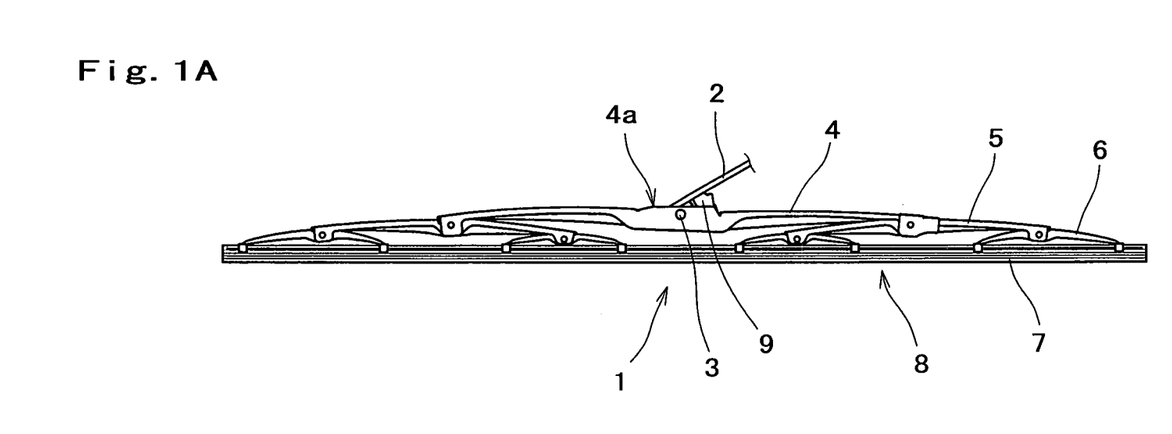
FIG. 1A is a side view and FIG. 1B is a plan view showing a state where a blade is attached to a wiper arm.
Figure 1B:
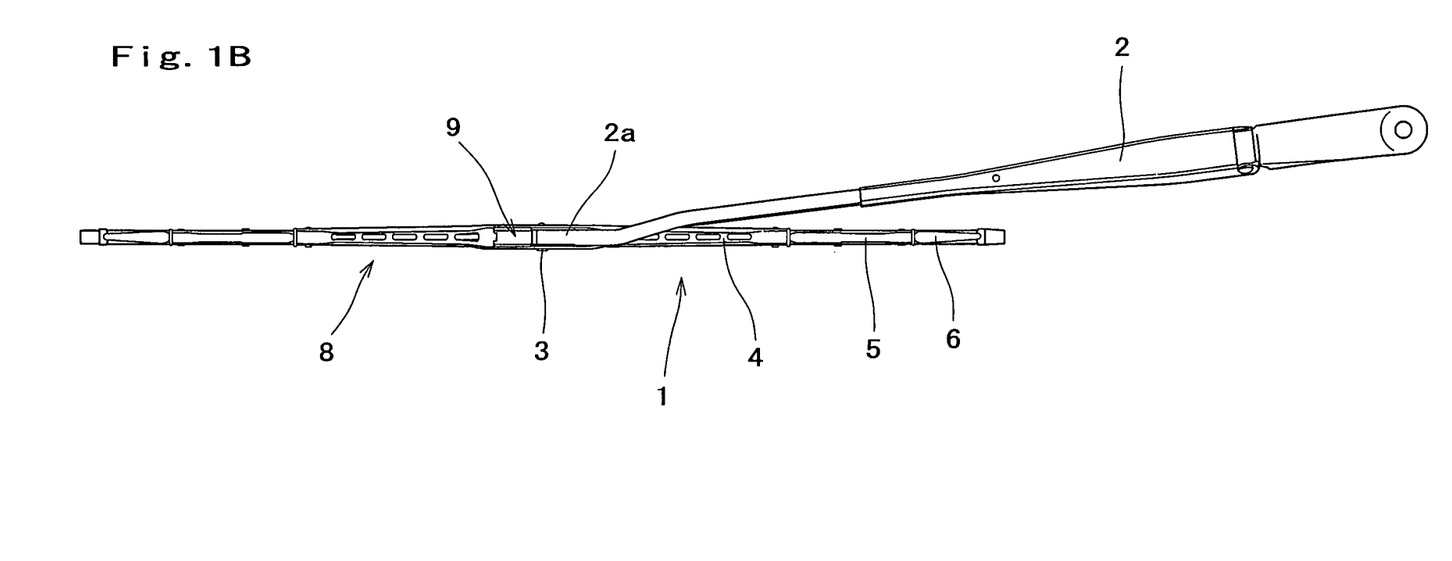

Next, an embodiment of the present disclosure will be described with reference to the drawings. In FIGS. 1A and 1B, reference numeral 1 denotes a wiper blade. The wiper blade 1 of this embodiment comprises a blade main body 8. The blade main body 8 comprises a primary lever 4 that is provided with a support shaft 3 for swingably supporting the wiper arm 2, secondary levers 5 that are swingably attached to both ends of the primary lever 4, yokes 6 that are swingably attached to both ends of the secondary lever 5, and blade rubbers 7 that are supported by the yokes 6. As being conventional, detailed descriptions of these will be omitted.

Figure 4A:
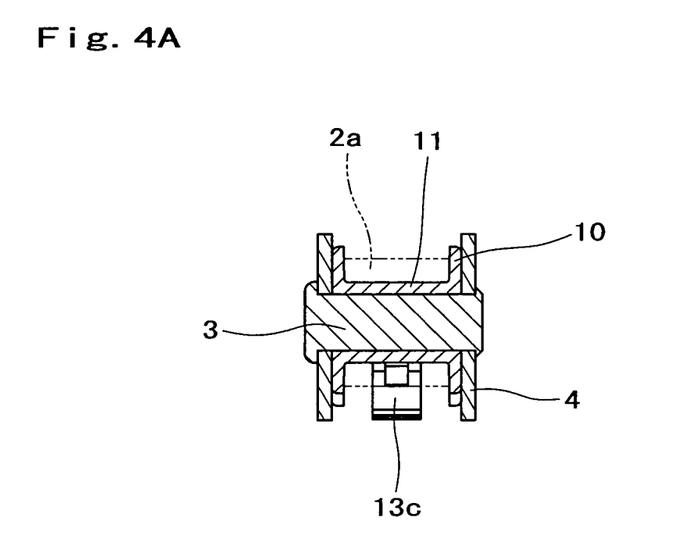
FIG. 4A is a longitudinal sectional view of a shaft support portion and FIG. 4B is a longitudinal sectional view of a projection portion in a state where the connection member is fitted to the blade main body.
Figure 4B:
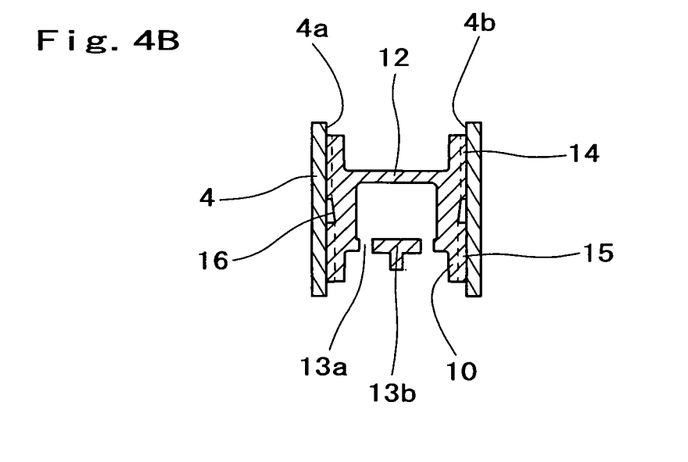

An opening 4a is formed on an upper surface of a central portion in a length direction where the support shaft 3 of the primary lever 4 is provided (see FIGS. 1A and 4B). While fitting into the opening 4a, a connection member 9, which will be described later, is swingably attached to the support shaft 3. A U-shaped tip end portion 2a of the wiper arm 2 is removably attached to the connection member 9. The wiper blade 1 can thus be attached to the wiper arm 2.

The connection member 9 comprises right and left side walls 10 that are formed to be long in an arm length direction of the wiper arm 2 (see FIGS. 2A, 2B, 2C, 3A, 3B, 4A, and 4B). Being fitted onto the support shaft 3, a shaft support 11 is swingably supported by the support shaft 3 (see FIG. 3A). Between the right and left side walls 10, the shaft support 11 is integrally formed in a lateral cylindrical shape across the right and left side walls 10 so as to deflect toward a tip end side in the arm length direction of the right and left side walls 10 and be positioned at a central portion in a vertical direction (see FIGS. 2A, 2C, 3A, and 4A). Both tip end side portions in the arm length direction of the right and left side walls 10 and upper and lower portions are formed so as to be shaped like lips. In the shaft support 11 and the right and left side walls 10, openings 11a and 10a are formed like notches so that the support shaft 3 can forcibly be removable therein (see FIGS. 2A and 2C).

Figure 3A:
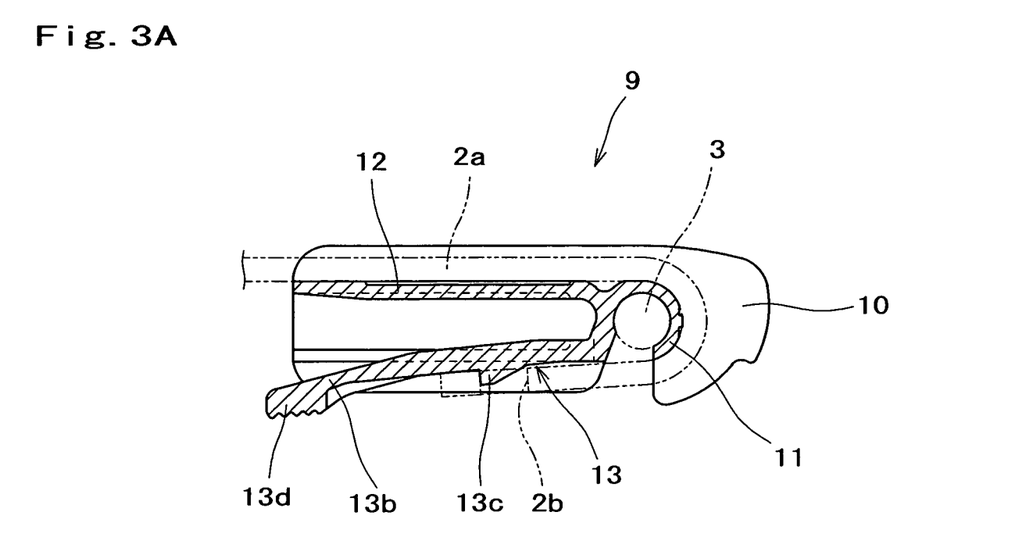
FIG. 3A is a sectional side view and FIG. 3B is a sectional front view of the connection member.
Figure 3B:
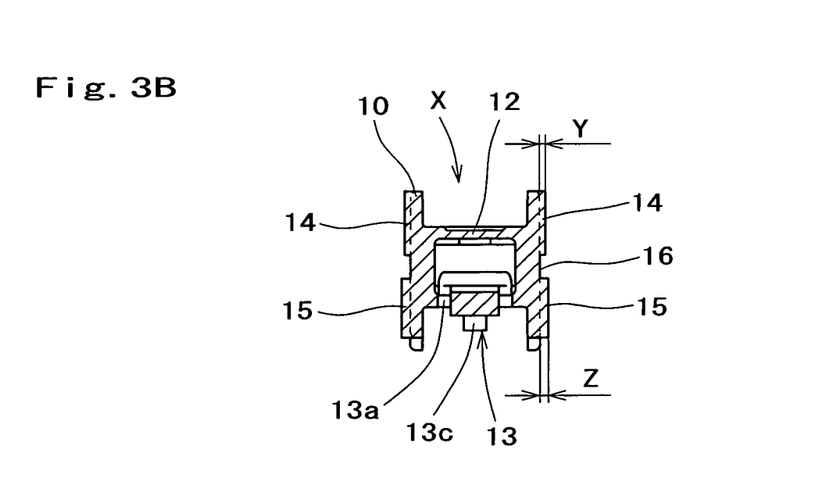

Furthermore, between the right and left side walls 10, upper and lower pieces 12 and 13, which are vertically spaced from each other, are formed so as to be continuous from the shaft support 11 and extend to base end positions in the arm length direction of the right and left side walls 10 (see FIGS. 3A and 3B). A connection X is thus formed by the shaft support 11 and the upper and lower pieces 12 and 13 (see FIGS. 2B, 2C, and 3B). The connection X has a U-shaped outer surface so that the wiper arm tip end portion 2a is fitted thereon. Of the right and left side walls 10, the upper side of the upper piece 12 and the lower side of the lower piece 13 are formed to be lip-like shaped, that is, open.

The upper piece 12 is integrally formed with the right and left side walls 10 so as to bridge the right and left side walls 10 (see FIGS. 3A, 3B, and 4B). The lower piece 13 is separated from the right and left side walls 10 because a pair of right and left notched grooves 13a are provided thereto in the vicinity of a side of a base end in the arm length direction of the shaft support 11 to the base end positions (see FIGS. 2C, 3B, and 4B). To the lower piece 13, an operation piece (release bar) 13b is provided so as to be elastically vertically deformable (see FIGS. 2C, 3A, and 4B).

To the operation piece 13b, formed are a latching projection 13c that removably fits into a latching hole 2b that is formed in the wiper arm tip end portion 2a, and an operation claw 13d that projects outward more than the base end portions of the right and left side walls 10 (see FIGS. 2A, 2B, 2C, and 3A, 3B, and 4A). By an upward operation of the operation claw 13d, the latching projection 13c that is latched into the latching hole 2b is released from the latching hole 2b. The wiper arm tip end portion 2a that is fitted onto the connection X can thus be removed from the connection X.

The wiper arm tip end portion 2a can be fitted onto the connection X, without an operation of the operation piece 13b, by an elastic deformation of the operation piece 13b. The latching projection 13c is engaged with the latching hole 2b by forcibly moving the wiper blade 1 toward the tip end side in the arm length direction while an opening of the tip end portion 2a is fitted from a side of the shaft support 11.

On outer surfaces of the right and left side walls 10, formed are upper and lower projections 14 and 15 that are positioned at a side of a base end in the arm length direction and project outward (see FIGS. 2A, 2B, 2C, 3B, and 4B). The upper projections 14 are plane so as to vertically extend in the arm length direction with respect to the upper piece 12 of the connection X that is formed on inner surfaces of the right and left side walls 10. The lower projections 15 are plane so as to vertically extend in the arm length direction with respect to the lower piece 13 of the connection X. The upper and lower projections 14 and 15 come into sliding contact with right and left inner side surfaces 4b of the primary lever opening 4a.

Figure 2A:
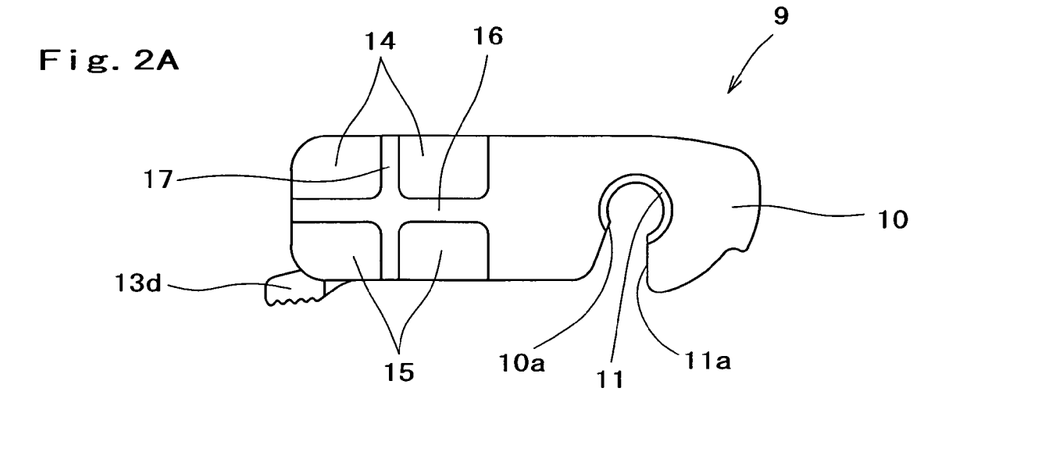
Figure 2B:
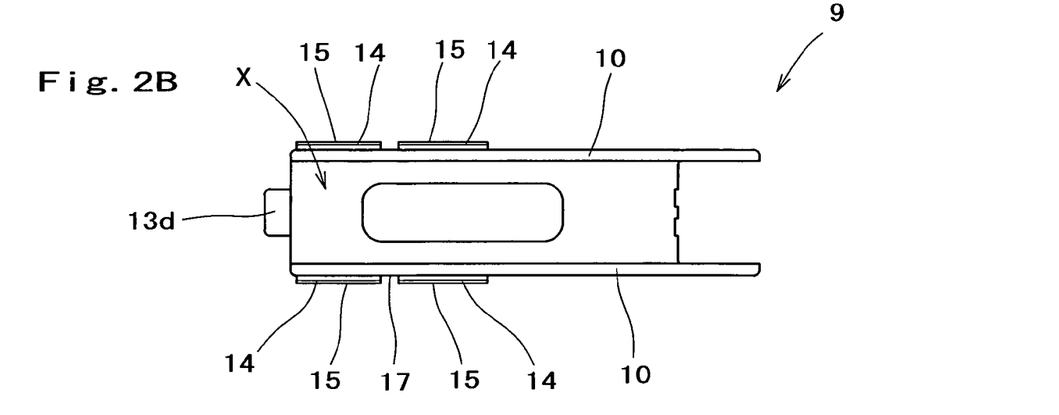
Figure 2C:
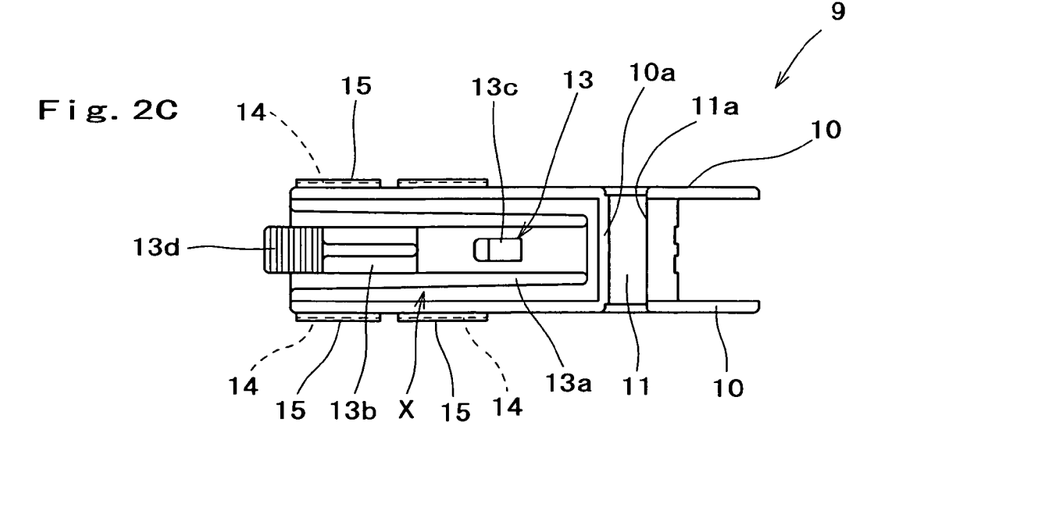
FIG. 2C is a bottom view of a connection member.

The upper and lower projections 14 and 15 are vertically partitioned by a lateral concave groove 16 that is positioned between the upper piece 12 and the lower piece 13 (see FIGS. 2A, 3B, and 4B). The upper and lower projections 14 and 15 are further partitioned into front and rear portions by a longitudinal concave groove 17 that is positioned at an intermediate portion in the arm length direction (see FIGS. 2A and 2B). In addition, projection amounts Y of the upper projections 14 from the right and left side walls 10 are smaller than projection amounts Z of the lower projections 15 from the right and left side walls 10 (Y<Z).

In the embodiment of the present invention constructed as described above, the connection member 9 is axially swingably supported by the support shaft 3 at a side of the blade main body 8 and removably attached to the wiper arm tip end portion 2a. To the connection member 9, the projections 14 and 15 are formed on outer side surface portions that are closer to the base end side in the arm length direction than the shaft support 11 portion of the right and left side walls 10 that are components of the connection member 9. Vibration is prevented during a wiping operation as the projections 14 and 15 come into sliding contact with inner side surfaces of the blade main body 8 side, that is, the inner side surfaces 4b of the primary lever 4 in this embodiment.

The lower projections 15 and the notched grooves 13a are formed at the lower piece 13 of the connection X that is formed on the connection member 9. Unlike the upper projections 14 that have the upper piece 12 that is integrally laid across the right and left side walls 10, the lower projections 15 have no supporting/supported function of the right and left side walls 10. Lower portions of the right and left side walls 10 may thus easily deform further inward instead of outward. Sliding with the primary lever inner side surfaces 4b is secured, however, even if such lower portions of the right and left side walls 10 deform further inward with respect to the upper portions, because the lower projections 15 have larger projection amounts than the upper projections 14. Vibration can thus be reduced during a wiping operation.

Furthermore, in this construction, because of the concave groove 16 between the upper and lower projections 14 and 15, whose projection amounts are distinct from each other, a positive deformation occurs in the concave groove 16 even when a different amount of inward deformation occurs between upper and lower halves of the right and left side walls 10. As a result, a natural deformation is obtained.

In addition, the upper projections 14 and the lower projections 15 are partitioned into the front and rear portions by the longitudinal concave groove 17. Even when a smaller amount of deformation occurs at the side of the base end because of the shaft support 11 that is integrally formed across the right and left side walls 10, a positive deformation occurs in the concave groove 17. As a result, a natural deformation is obtained.

Figure 5A:
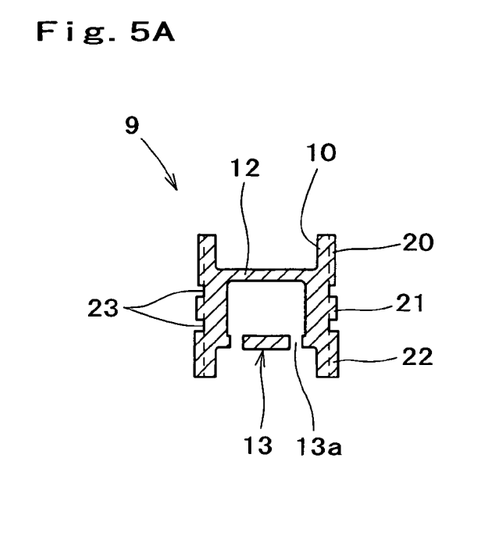
FIGS. 5A-5D are longitudinal sectional views of projection portions of the connection members of second through fifth embodiments, respectively.

The present invention is not limited to the above-described embodiment. As shown in FIG. 5A, a second embodiment can be carried out. The connection member 9 includes projections 20, 21, and 22 that respectively have a larger projection amount in three phases downward and are partitioned by concave grooves 23. The number of phases may be four or more instead of the three.

Figure 5B:
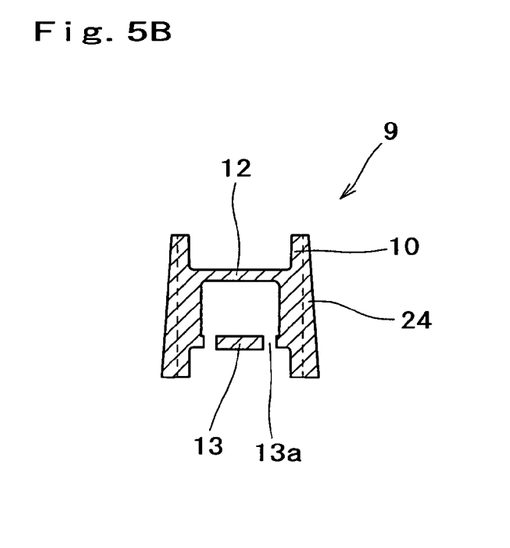

As shown in FIG. 5B, a third embodiment can be carried out. The connection member 9 includes a projection 24 that is formed into a continuous inclined surface whose projection amount is larger downward.

Figure 5C:
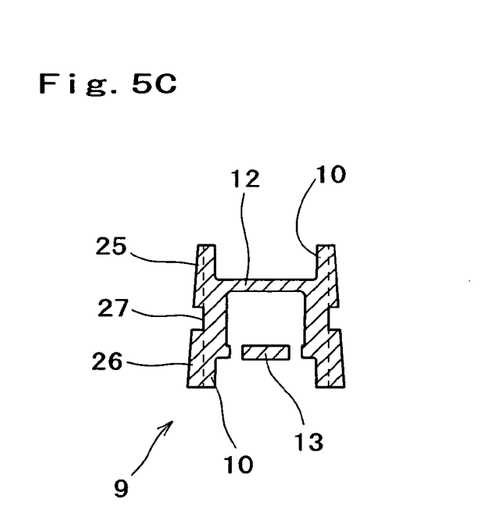

As shown in FIG. 5C, a fourth embodiment can be carried out. The connection member 9 includes inclined (or arc) projections 25 and 26 whose projection amounts are larger downward and are partitioned by a concave groove 27.

Figure 5D:
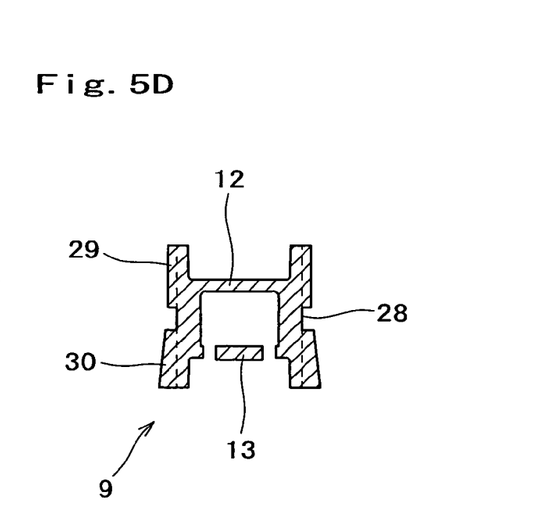

As shown in FIG. 5D, a fifth embodiment can be carried out. The connection member 9 includes a concave groove 28, an upper projection 29, and a lower projection 30. Partitioned by the concave groove 28, the upper projection 29 is plane, and the lower projection 30 is inclined so as to have a larger projection amount downward.

Figure 6A:
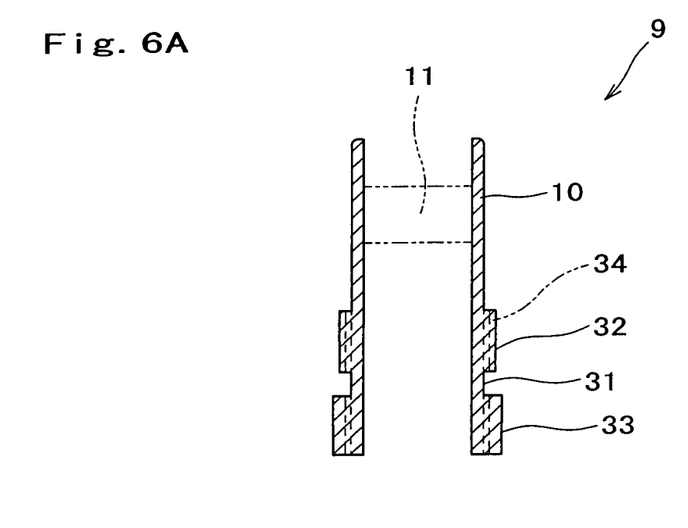
FIGS. 6A and 6B are cross sectional views of lower projection portions of connection members of sixth and seventh embodiments, respectively.

As shown in FIG. 6A, a sixth embodiment can be carried out. At a position farther from the shaft support 11, a projection amount of a lower projection is larger at a side of a base end in an arm length direction. The connection member 9 includes lower projections 32 and 33 that are partitioned into front and rear portions by a concave groove 31 so as to have a larger projection amount than an upper projection 34. A projection amount at a side of a tip end of the projection 33 is smaller than that at a side of a base end of the projection 32. As a result, at a lower side with a larger deformation amount at a position farther from the shaft support 11, a base end side of the projection 33 can reliably come into sliding contact with the blade main body.

Figure 6B:
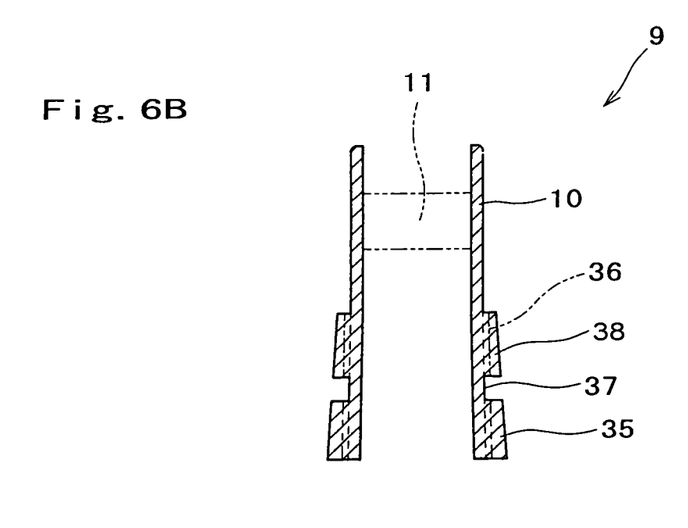

As a variation of the sixth embodiment above, a seventh embodiment can be carried out as shown in FIG. 6B. The connection member 9 includes lower projections 38 and 35 that have inclined surfaces whose projection amounts are larger farther from the shaft support 11 while maintaining a larger projection amount than an upper projection 36. In this embodiment, a concave groove 37 may or may not partition the lower projections 38 and 35 into a front and a rear portion.

The present disclosure is useful for a connection member that is mounted to a blade main for connecting and attaching a wiper blade to a wiper arm. On the outer side-surfaces of the right and left walls of the connection member, differently formed are the projections that come into sliding contact with the opening inner side surfaces, such that their outward projections are smaller on the upper piece side and larger on the lower piece side. As result, the lower projection is capable of reliably coming into sliding contact with the opening inner side surfaces, even if the lower piece greatly deforms inward because of being separated from the right and left wall so as to be elastically deformable for removably attaching to the wiper arm tip end portion. Achieved is thus the wiper blade with an excellent function to prevent vibration.

What is claimed is:

1. A connection member that is swingably fitted into an opening that is formed at a blade main body of a wiper blade so as to connect the blade main body to a wiper arm, the connection member comprising:
   right and left side walls;
   a shaft support portion that is swingably fitted onto a support shaft that is provided at the blade main body;
   upper and lower pieces that are formed so as to be continuous from the shaft support portion; and
   projections that come into sliding contact with inner side surfaces at the opening are formed on outer side surfaces of the right and left side walls, wherein:
      the shaft support portion and the upper piece are integrally formed so as to bridge the right and left side walls,
      the lower piece is formed so as to be separated from the right and left side walls by a notched groove provided on both ends of the lower piece adjacent to the right and left side walls,
      the projections include:
         upper projections that extend vertically both upward and downward with respect to the upper piece, and
         lower projections that extend vertically both upward and downward with respect to the notched grooves of the lower piece, the lower projections project outwardly in both right and left directions horizontally in line with the notched grooves, and outward projection amounts of the lower projections are larger than outward projection amounts of the upper projections and at least the lower projections are formed with a continuous inclined surface whose projection amount is larger downwards so that when lower portions of the right and left side walls deform further inward with respect to upper portions of the right and left side walls, sliding with the inner side surfaces of the blade main body is secured.

2. The connection member according to claim 1, wherein the upper projections and the lower projections are formed so as to be stepped such that the outward projection amounts of the lower projections are larger than the outward projection amounts of the upper projections.

3. The connection member according to claim 2, wherein the upper projections are partitioned by a lateral concave groove at an upper side; and the lower projections are partitioned by the lateral concave groove at a lower side.

4. The connection member according to claim 1, wherein:

the lower projections, which maintain larger projection amounts than the upper projections, include smaller projection amounts at a side of the shaft support portion.

5. The connection member according to claim 1, wherein:

the upper projections have a plane shape that vertically extends in an arm length direction of the wiper arm with respect to the upper piece; and the lower projections have a plane shape that vertically extends in an arm length direction with respect to the lower piece.

6. The connection member according to claim 1, wherein:

the lower projections are partitioned into front and rear portions by a longitudinal concave groove that is positioned at an intermediate portion in an arm length direction.

7. The connection member according to claim 1, wherein the upper projections and the lower projections are located closer to a base end side of the connection member than the shaft support portion.

8. The connection member according to claim 1, wherein the upper projections and the lower projections include at least one projection at each of the right and left side walls.

9. The connection member according to claim 1, wherein:

the upper projections are partitioned by a lateral concave groove at an upper side; and the lower projections are partitioned by the lateral concave groove at a lower side; and the upper projections have a plane shape and the lower projections have an inclined shape.

* * * * *